United States Patent
Shih et al.

(10) Patent No.: US 7,099,054 B2
(45) Date of Patent: Aug. 29, 2006

(54) IMAGE SCANNING APPARATUS CAPABLE OF POSITIONING A SCAN-STARTING POINT

(75) Inventors: Po-Sheng Shih, Hsinchu (TW); Hsing-Hung Lin, Hsinchu (TW)

(73) Assignee: Avision Inc., (TW)

( * ) Notice: Subject to any disclaimer, the term of this patent is extended or adjusted under 35 U.S.C. 154(b) by 898 days.

(21) Appl. No.: 10/121,512

(22) Filed: Apr. 15, 2002

(65) Prior Publication Data

US 2002/0159097 A1     Oct. 31, 2002

(30) Foreign Application Priority Data

Apr. 27, 2001 (TW) .............................. 90110227 A

(51) Int. Cl.
*H04N 1/04* (2006.01)
(52) U.S. Cl. .................. 358/474; 358/498; 358/497; 358/496
(58) Field of Classification Search ............. 358/474, 358/498, 497, 496, 486, 504, 505
See application file for complete search history.

(56) References Cited

U.S. PATENT DOCUMENTS

| | | | | |
|---|---|---|---|---|
| 5,091,654 A * | 2/1992 | Coy et al. | ............... | 250/559.29 |
| 5,113,267 A * | 5/1992 | Lee | ............................. | 358/448 |
| 5,144,455 A * | 9/1992 | Stein et al. | ................. | 358/443 |
| 5,895,928 A * | 4/1999 | Kerschner | .............. | 250/559.37 |
| 6,144,467 A * | 11/2000 | Tsai | ........................... | 358/486 |
| 6,353,486 B1 * | 3/2002 | Tsai | ........................... | 358/474 |
| 6,470,099 B1 * | 10/2002 | Dowdy et al. | ............. | 382/287 |
| 6,476,373 B1 * | 11/2002 | Gilpin | .................... | 250/208.1 |

* cited by examiner

Primary Examiner—Douglas Q. Tran
Assistant Examiner—Negussie Worku

(57) ABSTRACT

An image scanning apparatus with scan-starting point positioning function comprising a casing, a carriage and a calibration sheet is provided. Of which, the casing comprises a scan-platform used to place documents to be scanned, while the calibration sheet, which is fixed to the inner surface of the carriage and lies between the home line of the carriage and the upper wider margin of the scan-platform, comprises a hollowed-out mark completed through a punch-cutting manufacturing process. The mark can be defined using a predefined function set and has a reference point. After the carriage has moved to a scan line, the reference point can be located according to the intersection points between the mark scanned and the scan line accompanied by the predefined function set of the mark. Of which, the calibration sheet and the inner surface of the casing are of different levels of brightness.

17 Claims, 5 Drawing Sheets

IMAGE SCANNING APPARATUS CAPABLE OF POSITIONING A SCAN-STARTING POINT

This application incorporates by reference Taiwanese application Serial No. 090110227, Filed Apr. 27, 2001.

BACKGROUND OF THE INVENTION

1. Field of the Invention

The invention relates in general to an image scanning apparatus, and more particularly to an apparatus, which precisely and effectively positions and determines the scan-reference point.

2. Description of the Related Art

The use of image scanners has become more and more popular along with the coming of multimedia age. Meanwhile, the users' expectations of the quality and speed of image scanners are getting higher and higher. The carriage of an image scanner is normally driven using a step motor. After having finished scanning, it is not guaranteed that the carriage will return to exactly the same home position. If the carriage of an image scanner used to fetch images can be effectively and precisely shifted from home position to a document scan-starting point before scanning, no parts of the to-be-scanned documents will be missed out, nor will there be any non-document images scanned. Thus, the quality of document scanning can be improved. Conventionally, before image scanning is started, a 'scan-reference point' which has been predefined before the scanner leaves factory must be located first. Given the coordinates of the scan-reference point already known, the position of the scan-starting point will be located according to the 'vector relationship' between the scan-reference point and the scan-starting point, wherein the vector relationship has been defined before the scanner leaves factory. Conventional methods for positioning a starting point for image scanning are as follows:

(a) Referring to FIG. 1, a method using a corner of a reflection area 12 on a calibration sheet 10 as a reference point Q to define the position of the scan-starting point is disclosed in Taiwanese publication patent no. 147499. The relative position between the reference point Q and scan-starting point P has already been defined before the scanner leaves factory. To locate the position of the reference point Q, the carriage 11 only needs to move in the direction of Y-axis differentiating color changes between the reflection area 12 and the calibration sheet 10. The position of the scan-starting point P will thus be located accordingly; and the carriage 11 will start scanning after having returned to the scan-starting point P.

(b) Referring to FIG. 2, a method using an existing mark 22 on a calibration sheet 20 to define the position of the scan-starting point is disclosed in Taiwanese publication patent no. 338868. When the carriage 21 stops on any scan lines of the mark 22, two reference points Q1 and Q2 are chosen from the mark 22; the position of the scan-starting point P will be located according to the coordinates of the two reference points, the predefined function relation of mark 22, and a predefined length between a predefined reference point Q on the mark 22 and the scan-starting point P. After that, scanning proceeds.

However, the conventional method will result in at least the following three types of errors when printing a reflection area and a mark and installing a calibration sheet:

First, the error would occur when printing a reflection area or mark onto a calibration sheet.

Second, the error of cutting calibration sheet would occur. That is, when cutting a large calibration sheet into smaller ones after having finished the printing of reflection areas or marks onto a large calibration sheet, the cutting process could not produce patterns whose specifications of sizes and distances would match their original designs completely.

Third, the error of pasting would occur. That is, when pasting a calibration sheet onto a scanning apparatus, the position onto which the calibration sheet is pasted could not match with the position and vector relation of its original design completely.

When scanning images, a carriage's movements on the X-axis and Y-axis are measured by picture elements. Taking an ordinary scanner whose resolution is 600 dpi for instance, there are 600 picture elements per inch. For a scanner requiring a high standard of precision, the above-mentioned errors are not only unbearable but also unavoidable.

SUMMARY OF THE INVENTION

It is therefore an objective of this invention to provide an image scanning apparatus capable of positioning a scan-starting point, excluding the errors that would occur during the process of cutting and printing the calibration sheet, and thus improving the precision and quality of image scanning.

It is another objective of the invention to provide another image scanning apparatus capable of positioning the scan-starting point, comprising a casing, a carriage and a calibration sheet. The casing comprises a scan-platform on which documents to be scanned are placed. The calibration sheet, which is fixed to the inner surface of the carriage lying between the home line of the carriage and the upper wider margin of the scan-platform, comprises a hollowed-out mark completed through a punch-cutting manufacturing process. The mark can be defined using a predefined function set and has a reference point. After the carriage has moved to a scan line, the reference point can be located according to the intersection points between the mark scanned and the scan line accompanied by the predefined function set of the mark. The calibration sheet and the inner surface of the casing are of different levels of brightness.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
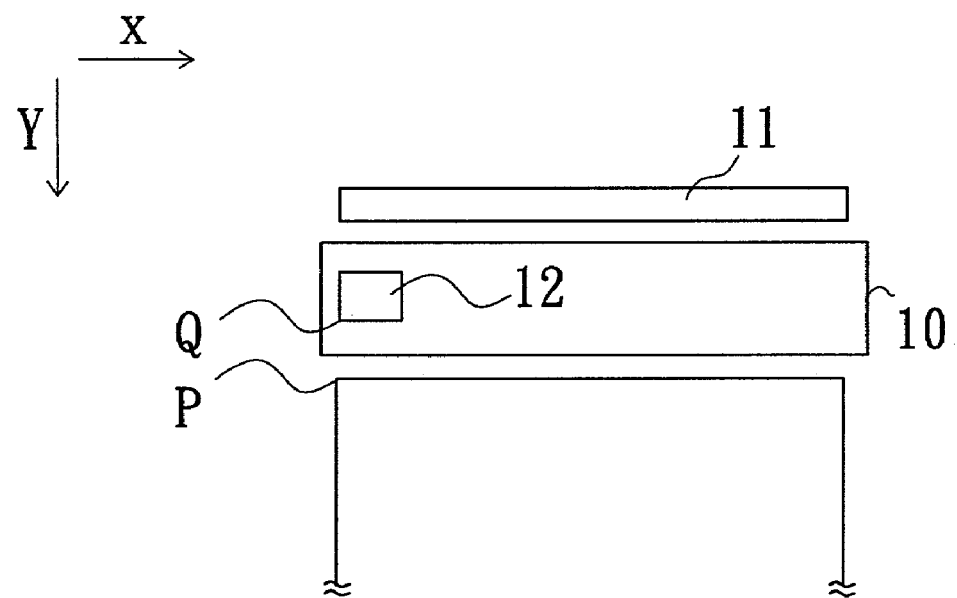
FIG. 1 shows a diagram of the positioning of a scan-starting point for a conventional image scanning apparatus.
Figure 2:
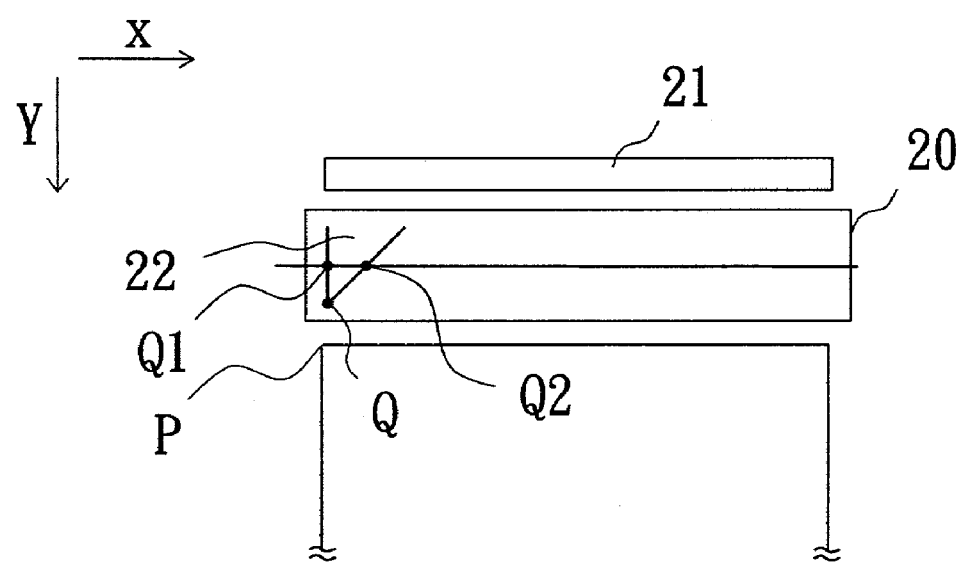
FIG. 2 shows another diagram of the positioning of a scan-starting point for a conventional image scanning apparatus.
Figure 3A:
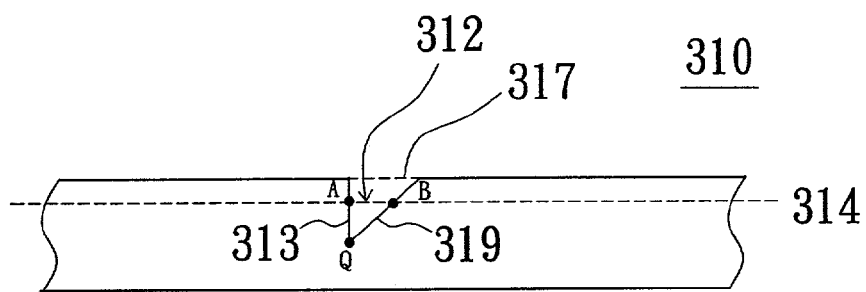
FIGS. 3A and 3B show two top views of a scanning apparatus according to a preferred embodiment of the invention.
Figure 3B:
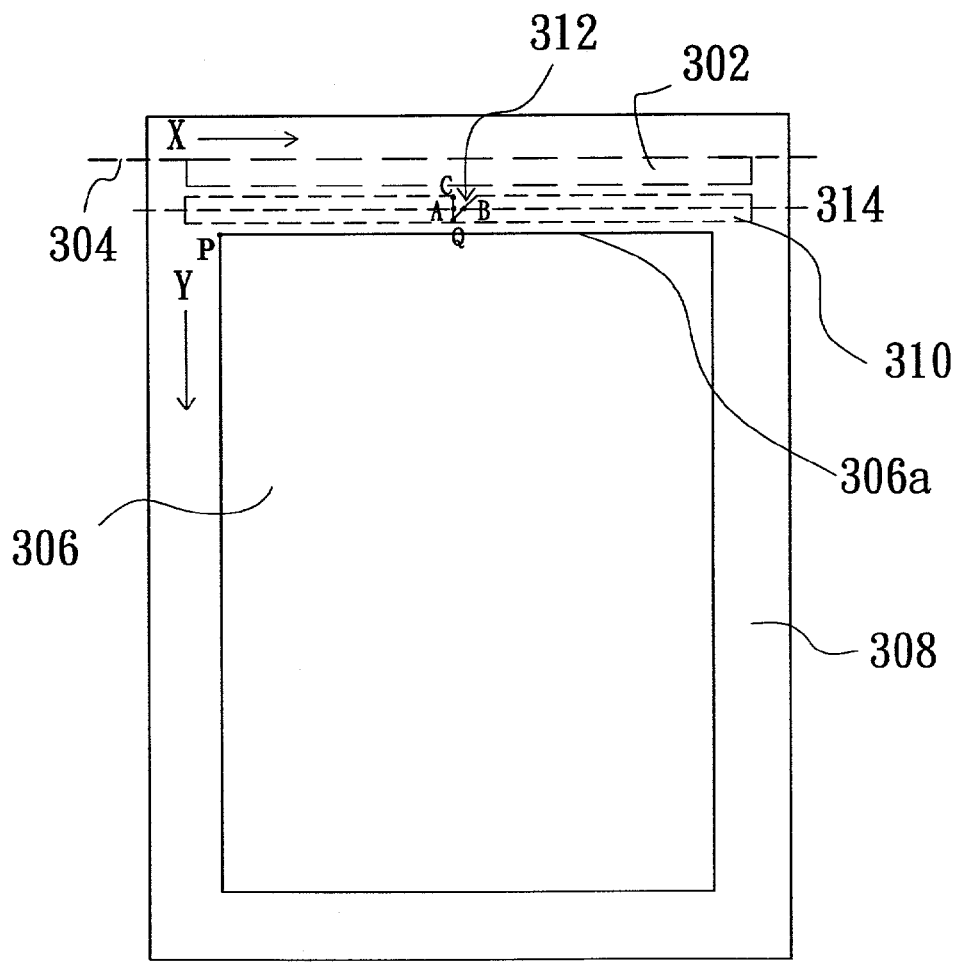
Figure 4:
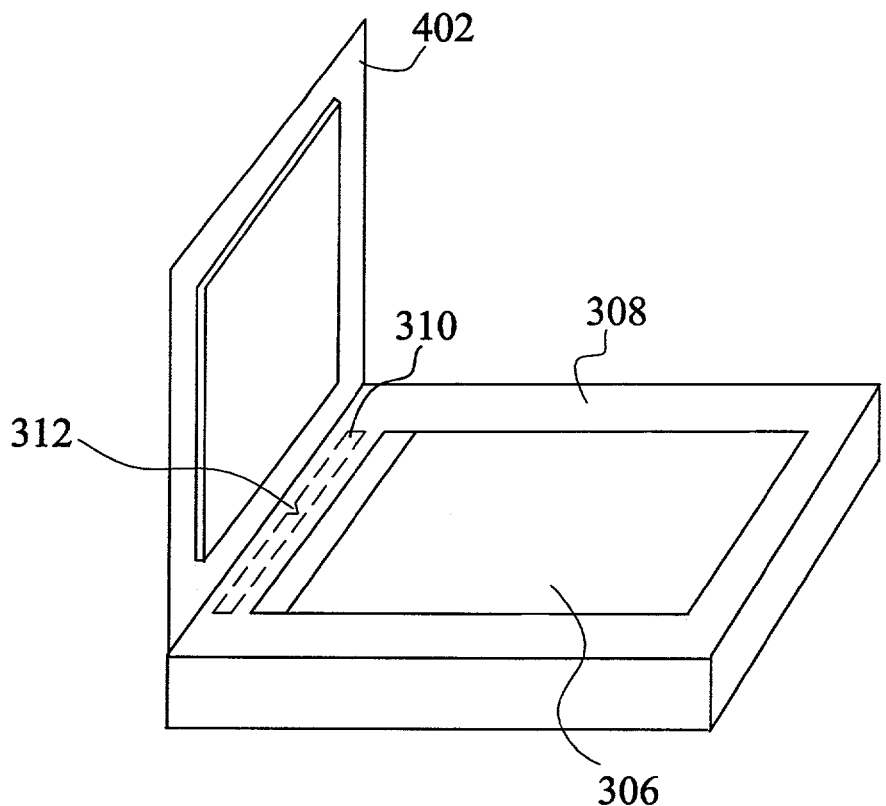
FIG. 4 is a pictorial view showing a scanning apparatus according to the invention.

Please refer first to FIGS. 3A and 3B showing two top views of a scanning apparatus according to a preferred embodiment of the invention. FIG. 3A shows a diagram of a calibration sheet according to the invention while FIG. 3B shows the diagram of a calibration sheet 310 fixed to a scanning apparatus to define a reference point Q. FIG. 4 shows a pictorial view of a scanning apparatus according to the invention, wherein label 402 refers to an upper cover of a scanner.

Please refer to FIGS. 3A, 3B and FIG. 4 at the same time. The image scanning apparatus of this invention includes a casing 308, a carriage 302, a scan-starting point P, a calibration sheet 310, and a hollowed-out mark 312. The casing 308 includes a scan-platform 306 for a to-be-scanned document to be placed on. The carriage 302 is movably installed within the casing 308 and below the scan-platform 306 for scanning a plurality of scanning lines 314 (only one is shown) on the casing 308 and the to-be-placed document. The scan-starting point P is defined on the scan-platform 306 and is a point for the carriage 302 to start scanning the to-be-scanned document. The calibration sheet 310 is attached to the casing 308. The hollowed-out mark 312 is formed in the calibration sheet 310.

The carriage 302 stations on a home line 304 before it is started or is in the READY status. The scan-platform 306 for a document (not shown in the diagram) to be placed on has four margins including an upper wider margin 306a. The scan-platform 306 is situated on the inner side of a casing 308, and the directions of X-axis and Y-axis are defined as shown in FIG. 3A. The carriage 302 moves alongside Y-axis to acquire the image of the to-be-scanned document. The calibration sheet 310 is fixed to the inner surface of casing 308 and lies between the home line 304 of the carriage and the upper wider margin 306a of the scan-platform. The home line and the upper wider margin are actually parallel to each other. A hollowed-out mark 312 is situated at the approximate center of the calibration sheet 310. The ideal figure for the mark is an isosceles right-angled triangle. One leg of the isosceles right-angled triangle 313 is parallel to Y-axis and is perpendicular to another leg of the isosceles right-angled triangle 317 with a hypotenuse 319 intersecting the leg 313 at point Q.

The method to position the reference point Q to proceed image scanning is as follows. First, after the to-be-scanned document is placed on the scan-platform 306, the carriage 302 moves to a scan line 314 which is roughly determined providing it falls within the area of the mark 312 such that the carriage 302 can sense the mark 312 and fetch the two intersection points A and B at which the scan line 314 intersects the leg 313 and the hypotenuse 319 of the isosceles right-angled triangle. Next, the coordinates of the reference point Q is determined using the characteristics of an isosceles right-angled triangle that the distance between the intersection points A and B is equal to that between intersection point A and reference point Q. Last, scanning is ready to be started.

For example, let the coordinates of intersection point B be (x1, y1) and that of an angular point C be (x2, y2). the X-axis coordinates for intersection point A, reference point Q and angular point C are all the same, i.e., x2. Since both intersection points A and B fall at the same scan line, their Y-axis coordinates are the same, i.e., y1. In other words, the coordinates for intersection point A are (x2, y1). Therefore, the length for line segment AB equals x1−x2. Since the function curve is a straight line whose slope is 1, the length of line segment AQ equals to that of line segment AB. Therefore, the Y-axis coordinate for reference point Q is y1+x1−x2. Accordingly, the coordinates for reference point Q are (x2, y1+x1−x2). The carriage 302 can thus fast and precisely locate the position of reference point Q to proceed scanning. Therefore, it can be concluded that the distance between the scan-starting point P and one of the scanning lines 314 intersecting the mark 312 at intersection points is determined according to the intersection points and a pattern of the mark 312.

One characteristic of this invention is to produce a hollowed-out mark using a punch-cutting manufacturing process, which largely reduces printing and cutting errors when compared to conventional methods. Conventionally, marks are printed onto a large calibration sheet which has not yet been hollowed out. Then, plural marks are cut out sequentially. Printing and cutting involve two different processes. As a consequence, errors are large. The punch-cutting method according to the invention is free of printing and cutting errors, because this method involves neither printing nor cutting. The only error remains is a precision problem during the process of mold manufacturing. But generally speaking, this method causes much less errors than that caused by the printing method.

Figure 5A:
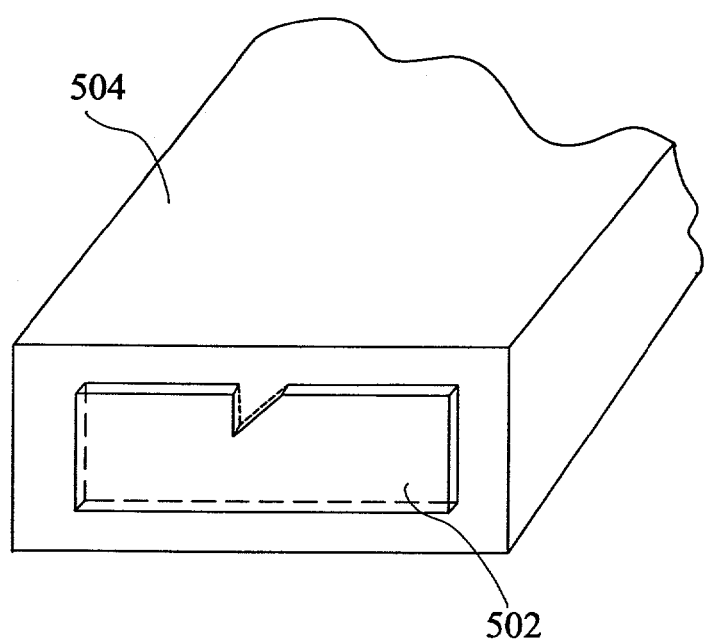
FIGS. 5A to 5C show three flow diagrams of manufacturing processes of a calibration sheet used in the invention using a punch-cutting method.
Figure 5B:
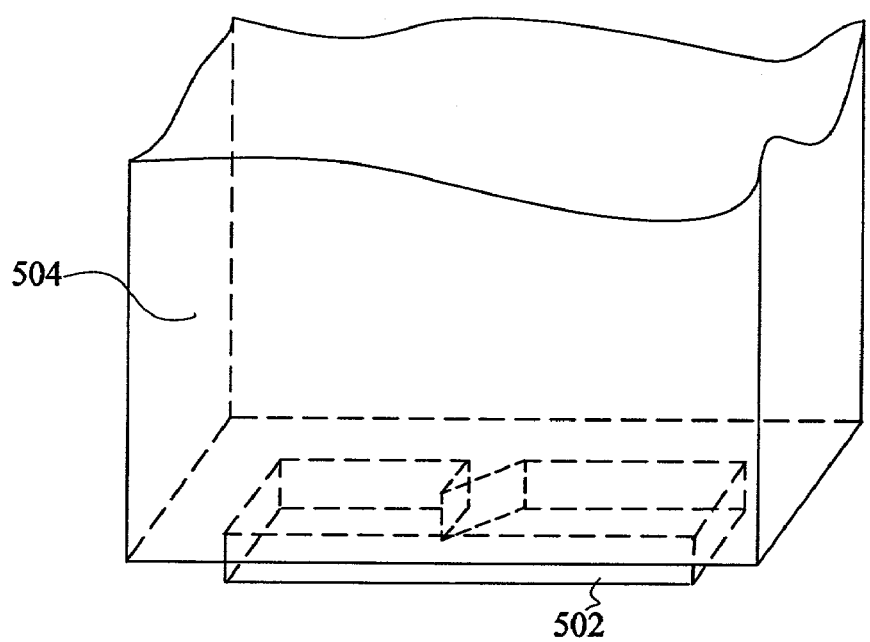
Figure 5B:
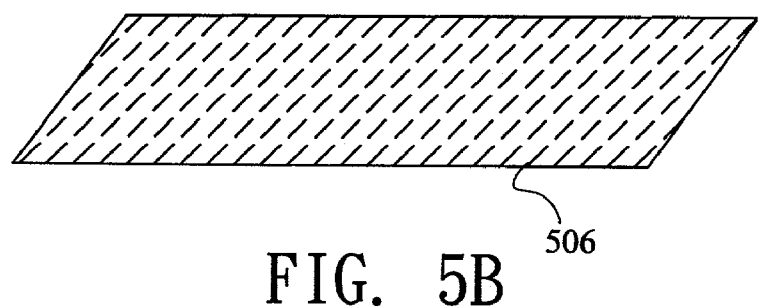
Figure 5C:
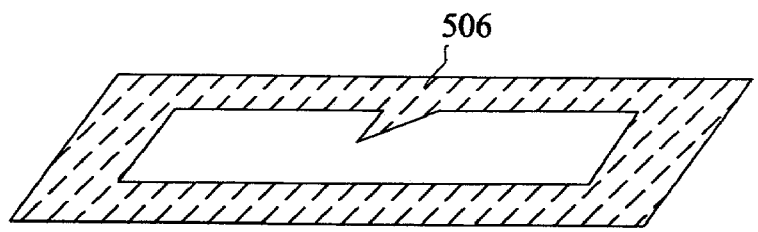
Figure 5C:
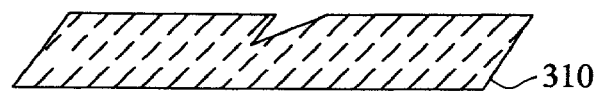

Please refer to FIGS. 5A to 5C, which shows three flow diagrams of the manufacturing process of a calibration sheet used in the invention using punch-cutting method. FIG. 5A shows a front view of the mold used in punch-cutting manufacturing process; FIG. 5B shows a diagram before punch-cutting is processed; and FIG. 5C shows a diagram after punch-cutting has been processed. The calibration plate pattern 502 to be punch-cut is inscribed onto a mold 504. After using the mold 504 to punch-cut the material for calibration sheet 506, a calibration sheet 310 can be obtained. It is worthy noting that for illustrating purpose, each time the punch-cutting method according to the invention as shown in FIGS. 5A to 5C produces one calibration sheet only. However, in real application, a mold with a plurality of calibration plate patterns can produce plural pieces of calibration sheet in a single punch-cutting process.

Another characteristic of the invention is to define the reference point Q using the properties that the calibration sheet 310 and the inner surface of the casing 308 have different performances in reflecting the light. The calibration sheet 310 can be pasted onto the inner surface of the casing 308, so the color of the hollowed-out mark 312 sensed by the carriage 302 is exactly the color of the inner surface of the casing 308. Therefore, the larger luminance difference between the color of calibration sheet 310 selected and that of the inner surface of the casing 308, black and white for instance, the better effect will be achieved. Most scanning apparatus are able to recognize the mark 312 provided color difference exists. In the above explanation, a mark 312 in the shape of an isosceles right-angled triangle is used as an example. Of course, the mark 312 can be a pattern of any functions provided the function relations have been set in the scanner before it leaves factory, and becomes an already known function when the user starts to operate.

Figure 6:
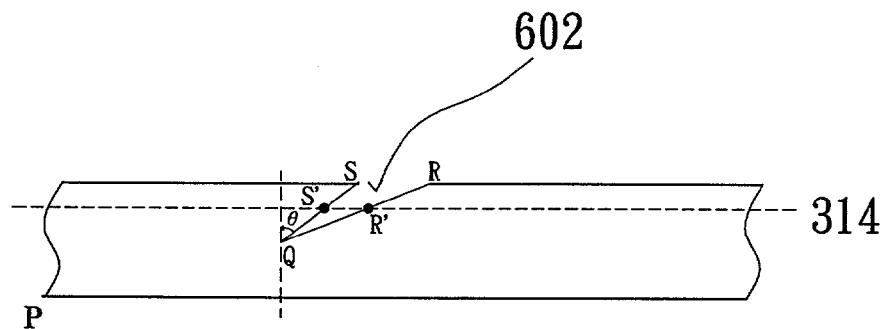
FIG. 6 illustrates another diagram of the mark in FIG. 3.

Please refer to the calibration sheet as shown in FIG. 6, wherein the mark 602 is an isosceles obtuse triangle with the vertex of one of its two non-obtuse angles being used as a reference point Q. The opposite side of reference point Q is parallel to X-axis; and vertex S is the vertex of the obtuse angle, whereas vertex R is the vertex of another non-obtuse angle. So, line segment SR and line segment SQ are of equal length; line segment QR is the longest side of the isosceles obtuse triangle; and the included angle θ has already been known. When the carriage 302 moves to the scan line 314, the two intersection points S' and R' at which the scan line 314 intersects line segments QS and QR will be sensed. Since the triangle S'R'Q is still an isosceles triangle and the included angle θ has already been known, the coordinates for reference point Q can thus be accurately obtained using these geometric relations.

Figure 7:
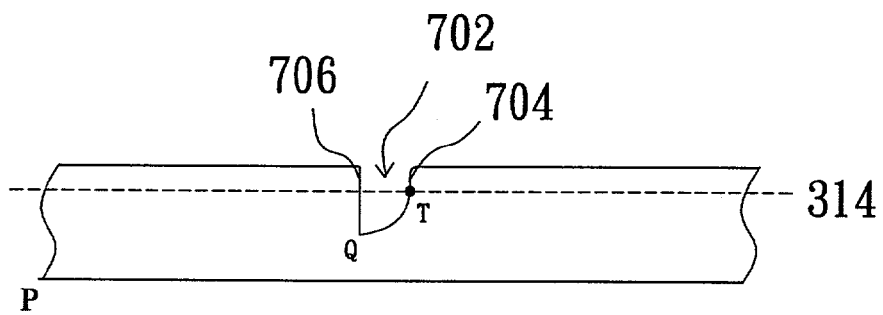
FIG. 7 shows a diagram when the hypotenuse of the mark in FIG. 3 is of any function figures.

Please refer to FIG. 7, which shows a diagram when the hypotenuse of the mark in FIG. 3 is of any function figures. In real application, a simple function is easier to be implemented. Let the function figure in FIG. 7 be a parabola 704; and further let the intersection point Q at which the parabola 704 intersects a line 706 be used as a reference point, wherein the line 706 is perpendicular to Y-axis. When the carriage 302 moves to the scan line 314, the coordinates for the intersection point T at which the scan line 314 intersects the parabola 704 will be obtained. After having obtained the coordinates for the image scanning reference point Q through parabola function relations, the carriage 302 can thus be positioned immediately and start to scan the to-be-scanned document.

Figure 8:
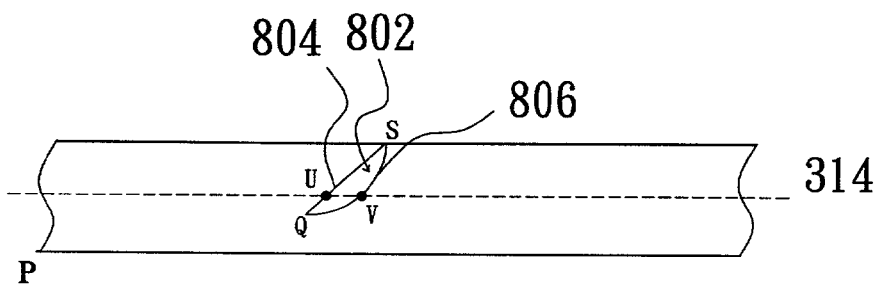
FIG. 8 shows a diagram of a mark defined by two function curves.

Please refer to FIG. 8, which shows a diagram of a mark 802 defined by two function curves. The two function curves can be function curve 804 and function curve 806 which intersect each other at point S and point Q. Point Q is a reference point while function curve 804 can be a straight line for instance. The scan line 314 intersects function curve 804 and function curve 806 at point U and point V respectively. The coordinates for the reference point Q can be obtained using function relations between intersection point U and intersection point V.

Figure 9:
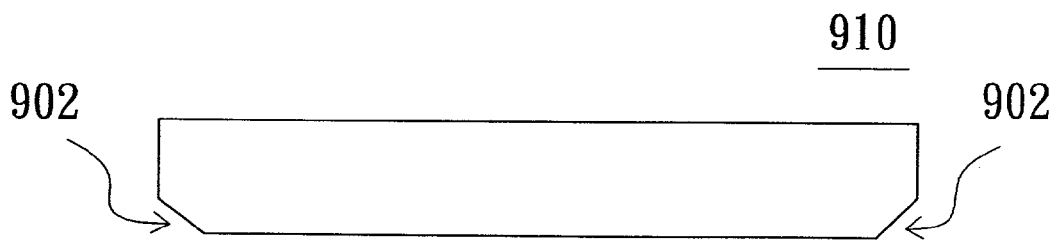
FIG. 9 shows a diagram of two marks.

The above examples are illustrated when the marks are situated at the approximate center of the calibration sheet. It has been found through experiments that the luminance distribution of a tube gives the best luminance around the central area on an ordinary scan-platform. Nevertheless, the location of marks is not necessarily to be limited to be at the central area. In real application, the marks can be located at the left-hand side, the right-hand side or any other parts of the calibration sheet provided the luminance of the tube is sufficient to differentiate color difference between the calibration sheet and the inner surface of the casing. As shown in FIG. 9, two marks 902 are located at the two sides of the calibration sheet 910 respectively.

It is noteworthy that marks are enlarged in the above examples for illustrating purpose. In real application, only small-sized marks are needed to position a scan-starting point.

Although the foregoing preferred embodiments only illustrate how to locate a scan-reference point, anyone who is familiar with this technology should be able to obtain the position of a scan-starting point given a reference point having been positioned because the distance between the scan-starting point and the scan-reference point is determined during manufacturing. So, the method to position a scan-starting point will not be repeated here.

The calibration sheet used in the image scanning apparatus disclosed in the foregoing preferred embodiments according to the invention is easy to be manufactured and is small in errors, which greatly improves the quality of image scanning.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image scanning apparatus, comprising:
   a casing including a scan-platform for a to-be-scanned document to be placed on;
   a carriage movably installed within the casing and below the scan-platform, the carriage scanning a plurality of scanning lines on the casing and the to-be-scanned document;
   a scan-starting point defined on the scan-platform, the scan-starting point being a point for the carriage to start scanning the to-be-scanned document;
   a calibration sheet attached to the casing, wherein the calibration sheet and an inner surface of the casing have luminance difference; and
   a hollowed-out mark formed in the calibration sheet, wherein a distance between the scan-starting point and one of the scanning lines intersecting the mark at intersection points is determined according to the intersection points and a pattern of the mark.

2. The image scanning apparatus according to claim 1, wherein the scanning lines intersecting the mark at two intersection points.

3. The image scanning apparatus according to claim 2, wherein the mark comprises a reference point that is fixedly separated from the scan-starting point and may be determined according to the intersection points and the pattern of the mark, and the scan-starting point is thereby determined according to the reference point.

4. The image scanning apparatus according to claim 1, wherein the pattern of the mark is an isosceles right-angled triangle.

5. The image scanning apparatus according to claim 1, wherein the pattern of the mark is an isosceles obtuse triangle.

6. The image scanning apparatus according to claim 1, wherein the pattern of the mark is defined by a first side, a second side and a function curve.

7. The image scanning apparatus according to claim 1, wherein the mark is approximately situated at the center of the calibration sheet.

8. An image scanning apparatus, comprising:
   a casing which comprises:
      a scan-platform for placing a document to be scanned, wherein the scan-platform comprises four margins, one of which is an upper wider margin, and
      an inner surface;
   a carriage installed at the scan-platform corresponding to an underneath of the document to be scanned, wherein the carriage returns to a starting line which is parallel to the upper wider margin of the scan-platform after having finished a scanning; and
   a piece of calibration sheet, which is fixed into the inner surface of the casing and lies between the starting line and the upper wider margin of the scan-platform, wherein the piece of calibration sheet and the inner surface of the casing have luminance difference, and the piece of the calibration sheet comprises:
      a hollowed-out marked block defined by a predefined function set, and
      reference point at an edge of the marked block, a position of the reference point leading to locating a scan-starting point, wherein, after the carriage has moved to a scan line, the reference point can be positioned according to the intersection points between the marked block and the scan line.

9. The image scanning apparatus according to claim 8, wherein the marked block is an isosceles right-angled triangle.

10. The image scanning apparatus according to claim 8, wherein the marked block is an isosceles obtuse triangle.

11. The image scanning apparatus according to claim 8, wherein the marked block is defined by a first side, a second side and a function curve.

12. The image scanning apparatus according to claim 8, wherein the marked block is defined by a first function curve and a second function curve, wherein the first function curve intersects the second function curve at a first point and a second point respectively, of which, the first point is the reference point.

13. The image scanning apparatus according to claim 12, wherein the first function curve is a straight line.

14. The image scanning apparatus according to claim 8, wherein the marked block is approximately situated at the center of the calibration sheet.

15. The image scanning apparatus according to claim 8, wherein the piece of calibration sheet comprises a plurality of marked blocks.

16. The image scanning apparatus according to claim 15, wherein the piece of calibration sheet comprises two blocks situated at two sides of the calibration sheet.

17. An image scanning apparatus, comprising:
   a casing including a scan-platform for a to-be-scanned document to be placed on;
   a carriage movably installed within the casing and below the scan-platform, the carriage scanning a plurality of scanning lines on the casing and the to-be-scanned document;
   a scan-starting point defined on the scan-platform, the scan-starting point being a point for the carriage to start scanning the to-be-scanned document;
   a calibration sheet attached to the casing; and
   a hollowed-out mark formed in the calibration sheet,
   wherein a distance between the scan-starting point and one of the scanning lines intersecting the mark at intersection points is determined according to the intersection points and a pattern of the mark, and
   wherein the scanning lines intersect the mark at two intersection points.

* * * * *